United States Patent Office 2,780,355
Patented Feb. 5, 1957

2,780,355

GELATIN CAPSULE CONTAINING WATER SOLUBLE SUBSTANCES

Blasey T. Palermo and John P. Stanley, Detroit, Mich., assignors to R. P. Scherer Corporation, Detroit, Mich., a corporation of Michigan No Drawing. Application November 9, 1953, Serial No. 391,137

1 Claim. (Cl. 206—84)

This invention relates to soft gelatin capsules containing chemicals or medicinals that normally attack the gelatin to disintegrate, deteriorate or penetrate the capsule shell, and to an improved method of capsulating such materials.

It is customary in the preparation of soft gelatin capsules first to make up a dispersion or solution of the active ingredient in an oily vehicle, preferably an edible vegetable oil. A measured amount of the dispersion or solution is then encapsulated in a plasticized gelatin shell. Certain substances which would offer advantages in capsule form have been impossible or impractical to encapsulate heretofore. In some instances these substances are insoluble in the usual oily vehicles and are different to encapsulate because they adversely affect the gelatin shell as above described. These troublesome substances include hygroscopic solids which have an immediate hydrolytic action on freshly prepared plasticized gelatin, such as chloral hydrate and choline chloride; and water soluble materials having a high degree of dissociation and having an immediate hydrolytic action on freshly prepared plasticized gelatin, for example, salts of strong acids and bases such as sodium chloride. Water solutions of these salts rapidly attack and perforate the gelatin shell and in some instances disintegration is so rapid that it is impossible even to form the capsule. In cases where the salt can be capsulated, the capsule becomes perforated shortly thereafter and begins to leak.

Other materials which have offered difficulty in capsulating are those which are highly volatile and have a tendency to migrate through freshly prepared plasticized gelatin, for example, low molecular weight alcohols including ethanol, iso-propanol, and pentanols. Substances such as glycerine and propylene glycol which are normally used as plasticizers for gelatin are also difficult to capsulate because they act as expected and rapidly soften the capsule to make it sticky and unusable.

We have also had difficulty in preparing the following materials using conventional methods: betaine hydrochloride, sodium sulfate, potassium chloride, potassium sulfate, methylethyl ketone, alkyl acetates having from 2 to 4 carbon atoms. These materials can be capsulated in accordance with the present invention.

We have found that water soluble chemicals and medicinals such as those set forth above can be capsulated in plasticized gelatin shells if the water soluble substance is dissolved or dispersed in a liquid water soluble hygroscopic organic liquid containing from 6 to 40 units of ethylene oxide per molecule. Those materials which we have found to be particularly effective include polyethylene glycols having a molecular weight of from 300 to 900; mono-fatty esters of polyethylene glycol such as polyethylene glycol monolaurate and polyethylene glycol monooleate; polyoxy ethylene ethers of mixed partial fatty esters of sorbitol anhydrides, such as polyoxy ethylene (20) sorbitan monooleate. It is important, of course, that the vehicle be liquid in form to permit filling the capsules on conventional capsulating equipment which handles only liquid materials.

Surprisingly, water soluble chemicals and medicinals that normally attack freshly prepared plasticized gelatin do not do so when prepared in vehicles of this type. While we do not know for certain the reason why these vehicles are successful and do not wish to limit ourselves to a theory of the invention, we know that these vehicles absorb water rather rapidly from the plasticized gelatin shell in which they are capsulated. We suspect that this relatively rapid dehydration occurring at the interfacial boundary reduces the permeability of the gelatin as well as makes the gelatin more resistant to hydrolytic and softening agents. Where conventional vehicles are used, such as edible vegetable oils, any transfer of water which occurs is from the contents of the capsule to the gelatin shell because the oil has no affinity for water. Sodium chloride dispersed in an oily vehicle apparently dissolves in the water which is available only at the gelatin shell interface, while sodium chloride dispersed in a polymerized polyhydric alcohol vehicle is prevented from dissolving at the gelatin interface because the water is moving from the interface and tends to keep the sodium chloride from contacting the shell. We have found that choline chloride, for example, does dissolve after encapsulation, although it is not completely soluble in the polyethylene glycol vehicle in the desired concentration for capsulation. The water for solution apparently comes from the gelatin shell. By the time the absorption process has been completed, the gelatin shell is considerably tougher by reason of having lost moisture to the absorptive vehicle and becomes capable of resisting the hydrolytic action of the choline chloride. An external drying medium usually employed in making capsules also contributes to the toughness of the gelatin shell.

We suspect that materials like ethanol and pentanol are absorbed by the polyethylene glycol vehicle, or in some manner are taken up by that vehicle and held tenaciously, so that the alcohol is not free to migrate into the gelatin shell and evaporate from its surface. Whatever be the physical and chemical explanation for this behavior, it is nevertheless true that the described water soluble hygroscopic organic liquids serve as excellent vehicles for water soluble chemicals and medicinals both from the standpoint of manufacture of the capsule, and from the standpoint of stability of the manufactured capsule.

In preparing capsules of water soluble substances that normally attack gelatin, the substance is dissolved or dispersed in the liquid water soluble vehicle. The concentration of the solution or dispersion is determined by the size of the dose and the size of the capsule desired. Since the desired volume of the capsule is known, the concentration of the active substance is calculated therefrom. Although the ratio of active ingredient to vehicle may vary over a wide range, a preferred range is from 1:1 to 7:1 by weight. Since the active ingredient is much more soluble in the water soluble hygroscopic liquid vehicles of the invention than they are in conventional oily vehicles, higher concentrations of the active ingredient is possible. Thus, the capsules may be of smaller volume, which is another decided advantage in the present invention.

These compositions may be capsulated in a shell of plasticized gelatin of conventional formulation having about 35 to 45 parts of gelatin, 15 to 25 parts of a plasticizer such as glycerine, and from 30 to 45 parts of water. The gelatin composition is prepared into a fluffy mass by mixing the ingredients thoroughly together and then transferring them to a melter kept under a more or less complete vacuum and heated until a smooth fluid mass is obtained. Capsules may be simultaneously formed and filled using a method and apparatus such as that disclosed in Patents 1,970,396; 2,288,327; and 2,318,718 to R. P. Scherer. The gelatin composition is first cast into endless ribbons about .030 to .070 inch thick on drums comprising part of the capsulating machine. A pair of such ribbons is advanced continuously along a converging path into juxtaposition between a pair of die rolls, each roll having a plurality of cooperating die cavities adapted to form a spherical shell from the gelatin ribbons about an accurately measured dosage of liquid content prepared in accordance with the invention, which content is discharged into the space between the ribbons. The capsule may be spherical, cylindrical with rounded ends, ellipsoidal or any other appropriate rounded shape. The pressure of the delivery of the fluid dosage deforms preselected areas of the ribbon into conformation with the cavities of the dies and the dies apply the pressure required to seal the gelatin at the periphery of the capsule. This capsulating operation is performed without trapping any air within the capsule and without wasting any of the fluid content.

Immediately after formation the capsules are relatively weak and are, therefore, dehydrated as by exposure to dry, warm air or to acetone or to some agent capable of extracting water from the capsule wall or shell. Dehydration toughens the gelatin wall. After dehydration the manufacturing process has been completed and the capsules are considered to be in final or finished form.

Specific examples illustrating how water soluble substances that normally attack or deteriorate plasticized gelatin may be prepared using the specific vehicles of the invention are set forth below. In these examples the proportions of ingredients in the plasticized gelatin shell compositions are absolute. In other words, the water normally present in the gelatin and glycerine is included in the weight given for water and thus the percentages for glycerine and gelatin are on a dry weight basis.

*Example 1*

Sixty-two parts by weight of sodium chloride were dispersed in 38 parts of polyethylene glycol 400 U. S. P. This dispersion was encapsulated in a gelatin capsule of 6.75 minims volume on the machine described above. The gelatin formulation used for the shell was as follows: gelatin, 45.0; glycerine, 22.5; water, 32.5. The capsules were dipped in acetone after formation as a preliminary drying aid and were then stored at room temperature and humidity. After 5½ weeks the capsules showed no signs of deterioration and were not soft or tacky and were completely free of perforations.

Similar capsules prepared in the same manner for comparison purposes were filled with a dispersion of sodium chloride (70 parts) in corn oil (30 parts). Except for the vehicle, the capsules were identical to those described above. Shortly after manufacture the capsules started to leak. After the acetone dehydration treatment they were very soft and adhered together in a sticky mass.

*Example 2*

Eighty parts of chloral hydrate were dissolved in 20 parts of polyethylene glycol 400 to which 25% water had been added. The water added to the polyethylene glycol increases the solvent power of the vehicle. The chloral hydrate was encapsulated in a gelatin capsule having the following formulation: gelatin, 39.50; glycerine, 23.30; water, 37.20. Capsules of 6.75 minims volume were prepared using the same procedure as described in Example 1. The capsules were formed without difficulty. After 5½ weeks storage at room temperature and humidity, the capsules were found to be in good condition.

*Example 3*

Ethyl alcohol, which normally diffuses through the gelatin shell of the capsule, was found to remain in the capsule if the alcohol was dissolved in polyethylene glycol 400 rather than in the usual oily vehicle. Equal parts by weight of ethyl alcohol and polyethylene glycol were mixed to form a solution and the solution was encapsulated in a gelatin capsule having the following formula: gelatin, 44.0; sorbitol, 21.7 and water, 34.3. The capsules were stored at room temperature and humidity, and examination after three weeks storage indicated that some of the liquid content had escaped and the capsules were not sticky nor had they softened.

*Example 4*

A chloral hydrate solution was prepared by dissolving 500 milligrams of chloral hydrate, U. S. P., in 324 milligrams of polyoxyethylene (20) sorbitan monooleate. This solution was capsulated in the usual fashion in a gelatin capsule of 9.6 minims volume. The gelatin formulation used was as follows: gelatin, 43.1; glycerine, 25.8, and water, 31.1. The capsules were dipped in acetone after formation, as a preliminary drying aid, and were then stored at room temperature and humidity. After seven months' storage, these capsules were in good condition.

Many details may be varied without departing from the principles of this invention and it is therefore, not our purpose to limit the patent granted on this invention otherwise than necessitated by the scope of the appended claim.

We claim:

A plasticized gelatin capsule containing a water soluble substance which normally attacks gelatin, said capsule comprising said water soluble substance in homogeneous admixture with polyoxyethylene (20) sorbitan monooleate, enclosed in a plasticized gelatin shell.

References Cited in the file of this patent

UNITED STATES PATENTS

| 2,111,504 | Bockmuhl | Mar. 15, 1938 |
| 2,234,479 | Scherer | Mar. 11, 1941 |
| 2,667,268 | Griffin | Jan. 26, 1954 |